(12) United States Patent
DiFoggio

(10) Patent No.: US 6,672,093 B2
(45) Date of Patent: Jan. 6, 2004

(54) DOWNHOLE SORPTION COOLING AND HEATING IN WIRELINE LOGGING AND MONITORING WHILE DRILLING

(75) Inventor: Rocco DiFoggio, Houston, TX (US)

(73) Assignee: Baker Hughes Incorporated, Houston, TX (US)

(*) Notice: Subject to any disclaimer, the term of this patent is extended or adjusted under 35 U.S.C. 154(b) by 29 days.

(21) Appl. No.: 10/036,972

(22) Filed: Dec. 21, 2001

(65) Prior Publication Data

US 2002/0104328 A1 Aug. 8, 2002

Related U.S. Application Data

(63) Continuation-in-part of application No. 09/756,574, filed on Jan. 8, 2001, now Pat. No. 6,341,498.

(51) Int. Cl.[7] ............................. F25B 15/00; F25D 23/12
(52) U.S. Cl. ........................................ 62/259.2; 62/476
(58) Field of Search .............................. 62/259.2, 260, 62/476, 64, 271, 268, 101; 165/45, 104.22

(56) References Cited

U.S. PATENT DOCUMENTS

| | | | |
|---|---|---|---|
| 4,205,531 A | 6/1980 | Brunberg et al. ............ 62/101 |
| 4,250,720 A | 2/1981 | Siegel ........................ 62/480 |
| 4,375,157 A | 3/1983 | Boesen ....................... 62/514 |
| 4,407,136 A * | 10/1983 | De Kanter .................... 62/64 |
| 4,703,629 A | 11/1987 | Moore ....................... 62/235.1 |
| 4,949,549 A | 8/1990 | Steidl et al. ................. 62/101 |
| 5,018,368 A * | 5/1991 | Steidl et al. ................. 62/480 |
| 5,144,245 A | 9/1992 | Wisler ....................... 324/338 |
| 5,197,302 A * | 3/1993 | Sabin et al. ................. 62/477 |
| 5,280,243 A | 1/1994 | Miller ....................... 324/303 |
| 5,503,222 A | 4/1996 | Dunne ..................... 165/104.12 |
| 5,816,311 A | 10/1998 | Osada et al. ................ 164/415 |
| 5,931,005 A | 8/1999 | Garrett et al. ................. 62/86 |
| 6,134,892 A | 10/2000 | Turner et al. ................. 62/3.2 |

* cited by examiner

Primary Examiner—Melvin Jones
(74) Attorney, Agent, or Firm—Madan, Mossman & Sriram, P.C.

(57) ABSTRACT

A cooling system in which an electronic component is cooled by using one or more containers of liquid and sorbent that transfer heat from the component to the fluid in the well bore. According to the present invention, a sorption cooling and heating system is provided for use in a well, such as down hole tool which is in a drill string through which a drilling fluid flows, or in a down hole tool, which is on a wire line. This cooling system comprises a housing adapted to be disposed in a wellbore, the sorption cooler comprising a water supply adjacent to a sensor or electronics to be cooled; a Dewar flask lined with phase change material surrounding the electronics/sensor and liquid supply; a vapor passage for transferring vapor from the water supply; and a sorbent in thermal contact with the housing for receiving and adsorbing the water vapor from the vapor passage and transferring the heat from the sorbed water vapor through the housing to the drilling fluid or well bore. The electronics or sensors adjacent to the water supply are cooled by the evaporation of the liquid. A sample chamber to be heated or other element such as a clock crystal which is intended to be heated for stability can be placed adjacent to the dessicant to provide heat.

22 Claims, 5 Drawing Sheets

DOWNHOLE SORPTION COOLING AND HEATING IN WIRELINE LOGGING AND MONITORING WHILE DRILLING

CROSS REFERENCE TO RELATED APPLICATIONS

This patent application is a continuation in part of U.S. patent application Ser. No. 09/756,574 filed on Jan. 8, 2001 now U.S. Pat. No. 6,341,498 entitled "Downhole Sorption Cooling of Electronics in Wireline Logging and Monitoring While Drilling" by Rocco DiFoggio.

BACKGROUND OF THE INVENTION

1. Field of the Invention

This present invention relates to a down hole tool for wire line or monitoring while drilling applications, and in particular relates to a method and apparatus for sorption cooling of sensors and electronics and heating of chambered samples deployed in a down hole tool suspended from a wire line or a drill string.

2. Summary of Related Art

In underground drilling applications, such as oil and gas or geothermal drilling, a bore hole is drilled through a formation deep in the earth. Such bore holes are drilled or formed by a drill bit connected to end of a series of sections of drill pipe, so as to form an assembly commonly referred to as a "drill string." The drill string extends from the surface to the bottom of the bore hole. As the drill bit rotates, it advances into the earth, thereby forming the bore hole. In order to lubricate the drill bit and flush cuttings from its path as it advances, a high pressure fluid, referred to as "drilling mud," is directed through an internal passage in the drill string and out through the drill bit. The drilling mud then flows to the surface through an annular passage formed between the exterior of the drill string and the surface of the bore.

The distal or bottom end of the drill string, which includes the drill bit, is referred to as a "down hole assembly." In addition to the drill bit, the down hole assembly often includes specialized modules or tools within the drill string that make up the electrical system for the drill string. Such modules often include sensing modules, a control module and a pulser module. In many applications, the sensing modules provide the drill string operator with information regarding the formation as it is being drilled through, using techniques commonly referred to as "measurement while drilling" (MWD) or "logging while drilling" (LWD). For example, resistivity sensors may be used to transmit and receive high frequency signals (e.g., electromagnetic waves) that travel through the formation surrounding the sensor.

The construction of one such device is shown in U.S. Pat. No. 5,816,311 (Turner). By comparing the transmitted and received signals, information can be determined concerning the nature of the formation through which the signal has traveled, and whether the formation contains water or hydrocarbons. One such method for sensing and evaluating the characteristics of the formation adjacent to the bore hole is disclosed in U.S. Pat. No. 5,144,245 (Wisler). Other sensors are used in conjunction with magnetic resonance imaging (MRI) such as that disclosed in U.S. Pat. No. 5,280,243 (Miller). Still other sensors include gamma scintillators, which are used to determine the natural radioactivity of the formation, and nuclear detectors, which are used to determine the porosity and density of the formation.

In other applications, sensing modules are utilized to provide data concerning the direction of the drilling and can be used, for example, to control the direction of a steerable drill bit as it advances. Steering sensors may include a magnetometer to sense azimuth and an accelerometer to sense inclination. Signals from the sensor modules are typically received and processed in the control module of the down hole tool. The control module may incorporate specialized electronic components to digitize and store the sensor data. In addition, the control module may also direct the pulser modules to generate acoustic pulses within the flow of drilling fluid that contain information derived from the sensor signals. These pressure pulses are transmitted to the surface, where they are detected and decoded, thereby providing information to the drill operator.

As can be readily appreciated, such an electrical system will include many sophisticated electronic components, such as the sensors themselves, which in many cases include printed circuit boards. Additional associated components for storing and processing data in the control module may also be included on printed circuit boards. Unfortunately, many of these electronic components generate heat. For example, the components of a typical MWD system (i.e., a magnetometer, accelerometer, solenoid driver, microprocessor, power supply and gamma scintillator) may generate over 20 watts of heat. Moreover, even if the electronic component itself does not generate heat, the temperature of the formation itself typically exceeds the maximum temperature capability of the components.

Overheating frequently results in failure or reduced life expectancy for thermally exposed electronic components. For example, photo multiplier tubes, which are used in gamma scintillators and nuclear detectors for converting light energy from a scintillating crystal into electrical current, cannot operate above 175° C. Consequently, cooling of the electronic components is important. Unfortunately, cooling is made difficult by the fact that the temperature of the formation surrounding deep wells, especially geothermal wells, is typically relatively high, and may exceed 200° C.

Certain methods have been proposed for cooling electronic components in applications associated with the monitoring and logging of existing wells, as distinguished from the drilling of new wells. One such approach, which requires isolating the electronic components from the formation by incorporating them within a vacuum insulated Dewar flask, is shown in U.S. Pat. No. 4,375,157 (Boesen). The Boesen device includes thermoelectric coolers that are powered from the surface. The thermoelectric coolers transfer heat from the electronics area within the Dewar flask to the well fluid by means of a vapor phase heat transfer pipe. Such approaches are not suitable for use in drill strings since the size of such configurations makes them difficult to package into a down hole assembly.

Another approach, as disclosed in U.S. Pat. No. (Owens) involves placing a thermoelectric cooler adjacent to an electronic component or sensor located in a recess formed in the outer surface of a well logging tool. This approach, however, does not ensure that there will be adequate contact between the components to ensure efficient heat transfer, nor is the electronic component protected from the shock and vibration that it would experience in a drilling application.

Thus, one of the prominent design problems encountered in down hole logging tools is associated with overcoming the extreme temperatures encountered in the down hole environment. Thus, there exists a need to reduce the temperature within the down hole tool in the region containing the electronics, to the within the safe operating level of the electronics. Various schemes have been attempted to resolve the temperature differential problem to keep the tool temperature below the maximum electronic operating temperature, but none of the known techniques have proven satisfactory.

Down hole tools are exposed to tremendous thermal strain. The down hole tool housing is in direct thermal contact with the bore hole drilling fluids and conducts heat from the bore hole drilling fluid into the down hole tool housing. Conduction of heat into the tool housing raises the ambient temperature inside of the electronics chamber. Thus, the thermal load on a non-insulated down hole tool's electronic system is enormous and can lead to electronic failure. Electronic failure is time consuming and expensive. In the event of electronic failure, down hole operations must be interrupted while the down hole tool is removed from deployment and repaired. Thus, various methods have been employed in an attempt to reduce the thermal load on all the components, including the electronics and sensors inside of the down hole tool. To reduce the thermal load, down hole tool designers have tried surrounding electronics with thermal insulators or placed the electronics in a vacuum flask. Such attempts at thermal load reduction, while partially successful, have proven problematic in part because of heat conducted from outside the electronics chamber and into the electronics flask via the feed-through wires connected to the electronics. Moreover, heat generated by the electronics trapped inside of the flask also raises the ambient operating temperature.

Typically, the electronic insulator flasks have utilized high thermal capacity materials to insulate the electronics to retard heat transfer from the bore hole into the down hole tool and into the electronics chamber. Designers place insulators adjacent to the electronics to retard the increase in temperature caused by heat entering the flask and heat generated within the flask by the electronics. The design goal is to keep the ambient temperature inside of the electronics chamber flask below the critical temperature at which electronic failure may occur. Designers seek to keep the temperature below critical for the duration of the logging run, which is usually less than 12 hours.

Electronic container flasks, unfortunately, take as long to cool down as they take to heat up. Thus, once the internal flask temperature exceeds the critical temperature for the electronics, it requires many hours to cool down before an electronics flask can be used again safely. Thus, there is a need to provide an electronics and or component cooling system that actually removes heat from the flask or electronics/sensor region without requiring extremely long cool down cycles which impede down hole operations. As discussed above, electronic cooling via thermoelectric and compressor cooling systems has been considered, however, neither have proven to be viable solutions.

Thermoelectric coolers require too much external power for the small amount of cooling capacity that they provide. Moreover, few if any of the thermoelectric coolers are capable of operating at down hole temperatures. Additionally, as soon as the thermoelectric cooler system is turned off, the system becomes a heat conductor that enables heat to rapidly conduct through the thermoelectric system and flow back into the electronics chamber from the hotter regions of the down hole tool. Compressor-based cooling systems also require considerable power for the limited amount of cooling capacity they provide. Also, most compressors seals cannot operate at the high temperatures experienced down hole because they are prone to fail under the thermal strain.

Thus, there is a need for a cooling system that addresses the problems encountered in known systems discussed above. Consequently, it would be desirable to provide a rugged yet reliable system for effectively cooling the electronic components and sensors utilized down hole that is suitable for use in a well bore. It is desirable to provide a cooling system that is capable of being used in a down hole assembly of a drill string or wire line.

Another problem encountered during down hole operations is cooling and associated depressurization of hydrocarbon samples taken into a downhole tool. As the tool is retrieved from the bore hole the sample cools and depressurizes. Thus there is a need for heating method and apparatus to prevent cooling and depressurization of down hole hydrocarbon samples.

SUMMARY OF THE INVENTION

It is an object of the current invention to provide a rugged yet reliable system for effectively cooling the electronic components that is suitable for use in a well, and preferably, that is capable of being used in a down hole assembly of a drill string or wire line. This and other objects is accomplished in a sorption cooling system in which an electronic component or sensor is juxtaposed with one or more liquid sorbent coolers that facilitate the transfer of heat from the component to the wellbore.

According to the present invention, a sorbent cooling system for use in a well, such as down hole tool in a drill string through which a drilling fluid flows, or a wire line comprises (i) a housing adapted to be disposed in a well and exposed to the fluid in the well, (ii) a liquid supply, the liquid cooler comprising a water supply adjacent to a sensor or electronic components to be cooled (iii) a Dewar flask lined with phase change material surrounding the electronics/sensor and liquid supply, (iv) a vapor passage for transferring vapor from the liquid supply; and (v) a sorbent in thermal contact with the housing for receiving and adsorbing the water vapor from the vapor passage and transferring the heat from the water vapor through the housing to the drilling fluid or well bore. The electronics or sensor adjacent to the water supply is cooled by the evaporation of the liquid.

DETAILED DESCRIPTION OF THE INVENTION

Figure 1:
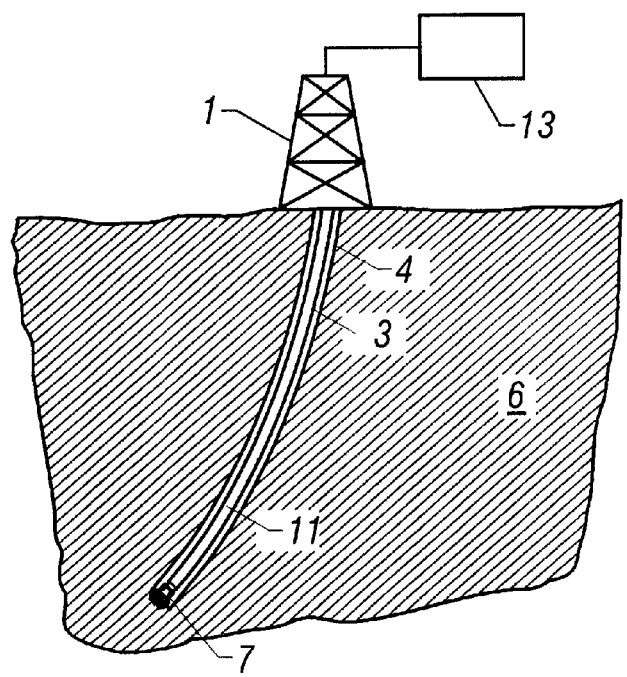
FIG. 1 is an illustration of a preferred embodiment of the present invention shown in a monitoring while drilling environment.

The present invention provides a structure and method for a down hole tool component cooling system. The down hole tool component cooling system of the present invention does not require an external power source. The cooling system of the present invention utilizes the potential energy of sorption as the source of energy for pumping heat from a first region of the tool, housing the tool component which is to be cooled, to a hotter region in the down hole tool. The cooling region of the tool contains a liquid surrounding or adjacent to the component to be cooled. When a portion of a liquid evaporates, the remaining liquid is cooled. The cooling of the liquid thereby cools the adjacent to component, keeping the component within a safe operating temperature. Thus, the present invention provides a structure and method whereby the down hole electronics or other components are surrounded by or adjacent to a cooling liquid. The liquid surrounding or adjacent to the electronics or component is cooled by controlled evaporation, thereby cooling the electronics or other component, such as a sensor.

In a preferred embodiment, water has proven to be a particularly effective coolant. Evaporation of one liter of water removes 631.63 Watt-hours of energy. Water is also cheap, readily available worldwide, nontoxic, chemically stable, and poses no environmental disposal problems. Thus, evaporation of one liter of water can remove 632 Watts for one hour, 63 Watts for 10 hours, or 6.3 Watts for 100 hours. In a preferred embodiment of the present invention, a container of water is placed inside the cooling region of the down hole tool, preferably inside a Dewar flask. The Dewar flask or container, comprising a cooling chamber, is connected via a vapor passage, such as a tube, to a container of desiccant located in a heat sink region elsewhere in the tool. The preferred desiccant sorbs water vapor, which travels from the evaporating liquid in the cooling region through the vapor passage to the desiccant in the heat sink region. The heat sink region, containing the desiccant is in efficient thermal contact with the down hole tool housing which is in thermal contact with the high temperature well bore. The desiccant sorbs the water vapor from the vapor passage at elevated temperatures, thereby keeping the vapor pressure low. Low vapor pressure facilitates additional water evaporation, enabling additional cooling within the cooling chamber comprising the electronics Dewar flask or other container surrounding or adjacent to the electronics in the cooling chamber.

In a preferred embodiment, approximately 6.25 volumes of loosely packed desiccant are utilized to sorb 1 volume of water. After each logging run, the desiccant can either be discarded or regenerated. Desiccants are regenerated by heating them so that they release the water or other liquid they have absorbed during sorption cooling. Some sorbents, referred to as desiccants, are able to selectively sorb water. Some desiccants retain sorbed water even at high temperatures. Molecular Sieve 3A (MS-3A), a synthetic zeolite with 3 Angstrom pore sizes, is such a desiccant. The temperature for regeneration, or expulsion of sorbed water for MS-3A ranges from 175° to 350° centigrade.

Figure 2:
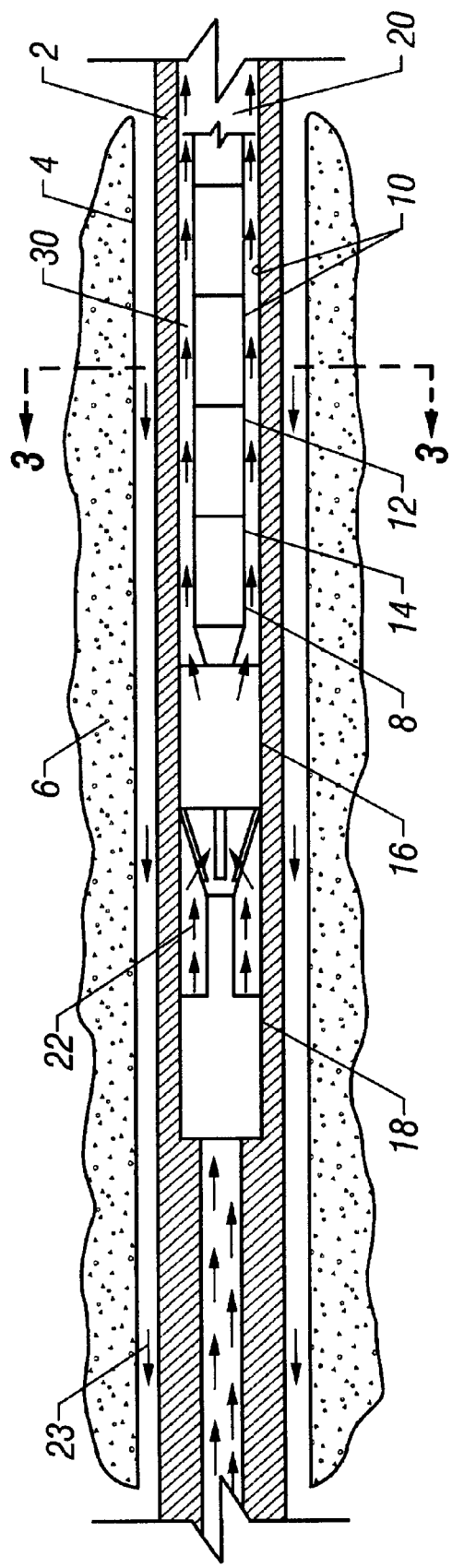
FIG. 2 is a longitudinal cross section through a portion of the down tool attached to the drill string as shown in FIG. 1 incorporating the sorbent cooling apparatus of the present invention.

A drilling operation according to the current invention is shown in FIG. 1. A drill rig 1 drives a drill string 3 that, which typically is comprised of a number of interconnecting sections. A down hole assembly 11 is formed at the distal end of the drill string 3. The down hole assembly 11 includes a drill bit 7 that advances to form a bore 4 in the surrounding formation 6. A portion of the down hole assembly 11, incorporating an electronic system 8 and cooling systems according to the current invention, is shown in FIG. 2. The electrical system 8 may, for example, provide information to a data acquisition and analysis system 13 located at the surface. The electrical system 8 includes one or more electronic components. Such electronic components include those that incorporate transistors, integrated circuits, resistors, capacitors, and inductors, as well as electronic components such as sensing elements, including accelerometers, magnetometers, photomultiplier tubes, and strain gages.

The down hole portion 11 of the drill string 3 includes a drill pipe, or collar, 2 that extends through the bore 4. As is conventional, a centrally disposed passage 20 is formed within the drill pipe 2 and allows drilling mud 22 to be pumped from the surface down to the drill bit. After exiting the drill bit, the drilling mud 23 flows up through the annular passage formed between the outer surface of the drill pipe 2 and the internal diameter of the bore 4 for return to the surface. Thus, the drilling mud flows over both the inside and outside surfaces of the drill pipe. Depending on the drilling operation, the pressure of the drilling mud 22 flowing through the drill pipe internal passage 20 will typically be between 1,000 and 20,000 pounds per square inch, and, during drilling, its flow rate and velocity will typically be in the 100 to 1500 GPM range and 5 to 150 feet per second range, respectively.

As also shown in FIG. 2, the electrical system 8 is disposed within the drill pipe central passage 20. The electrical system 8 includes a number of sensor modules 10, a control module 12, a power regulator module 14, an acoustic pulser module 18, and a turbine alternator 16 that are supported within the passage 20, for example, by struts extending between the modules and the drill pipe 2. According to the current invention, power for the electrical system 8, including the electronic components and sensors, discussed below, is supplied by a battery, a wire line or any other typical power supply method such as the turbine alternator 16, shown in FIG. 2, which is driven by the drilling mud 22. The turbine alternator 16 may be of the axial, radial or mixed flow type. Alternatively, the alternator 16 could be driven by a positive displacement motor driven by the drilling mud 22, such as a Moineau-type motor. In other embodiments, power could be supplied by any power supply apparatus including an energy storage device located downhole, such as a battery.

Figure 3:
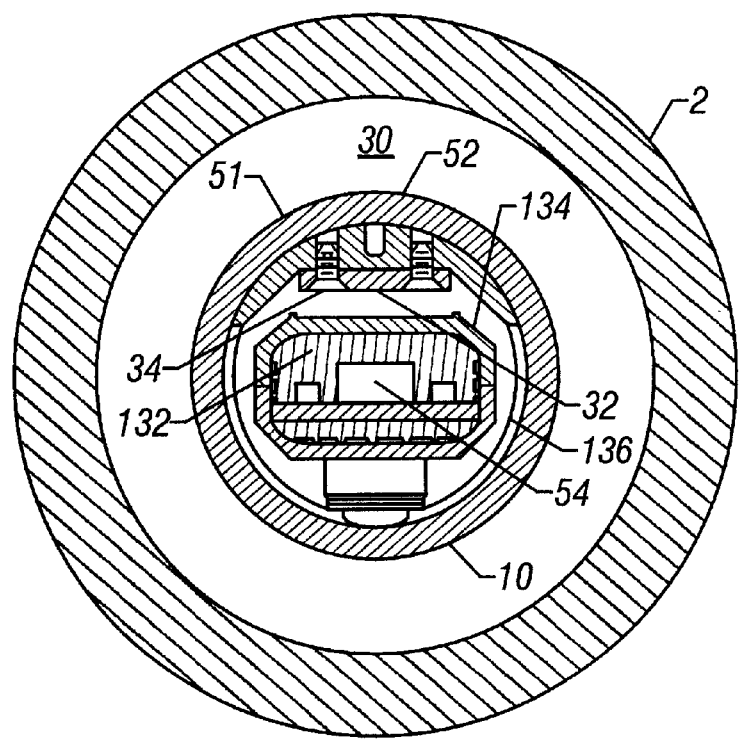
FIG. 3 is a transverse cross section through one of the sensor modules shown in FIG. 2 taken along line III—III.

As shown in FIG. 3, each sensor module 10 is comprised of a cylindrical housing 52, which is preferably formed from stainless steel or a beryllium copper alloy. An annular passage 30 is formed between the outer surface 51 of the housing 52 and the inner surface of the drill pipe 2. The drilling mud 22 flows through the annular passage 30 on its way to the drill bit 7, as previously discussed. The housing 52 contains an electronic component 54 for the sensor module. The electronic component 54 may, but according to the invention does not necessarily, include one or more printed circuit boards associated with the sensing device, as previously discussed. Alternatively, the assembly shown in FIG. 3 could comprise the control module 12, power regulator module 14, or pulser module 18, in which case the electronic component 54 may be different than those used in the sensor modules 10, although it may, but again does not necessarily, include one or more printed circuit boards. According to the current invention, one or more of the electronic components or sensors in the electrical system 8 are cooled by evaporation of liquid from the liquid supply 132 adjacent to or surrounding electronics 54.

Figure 4:
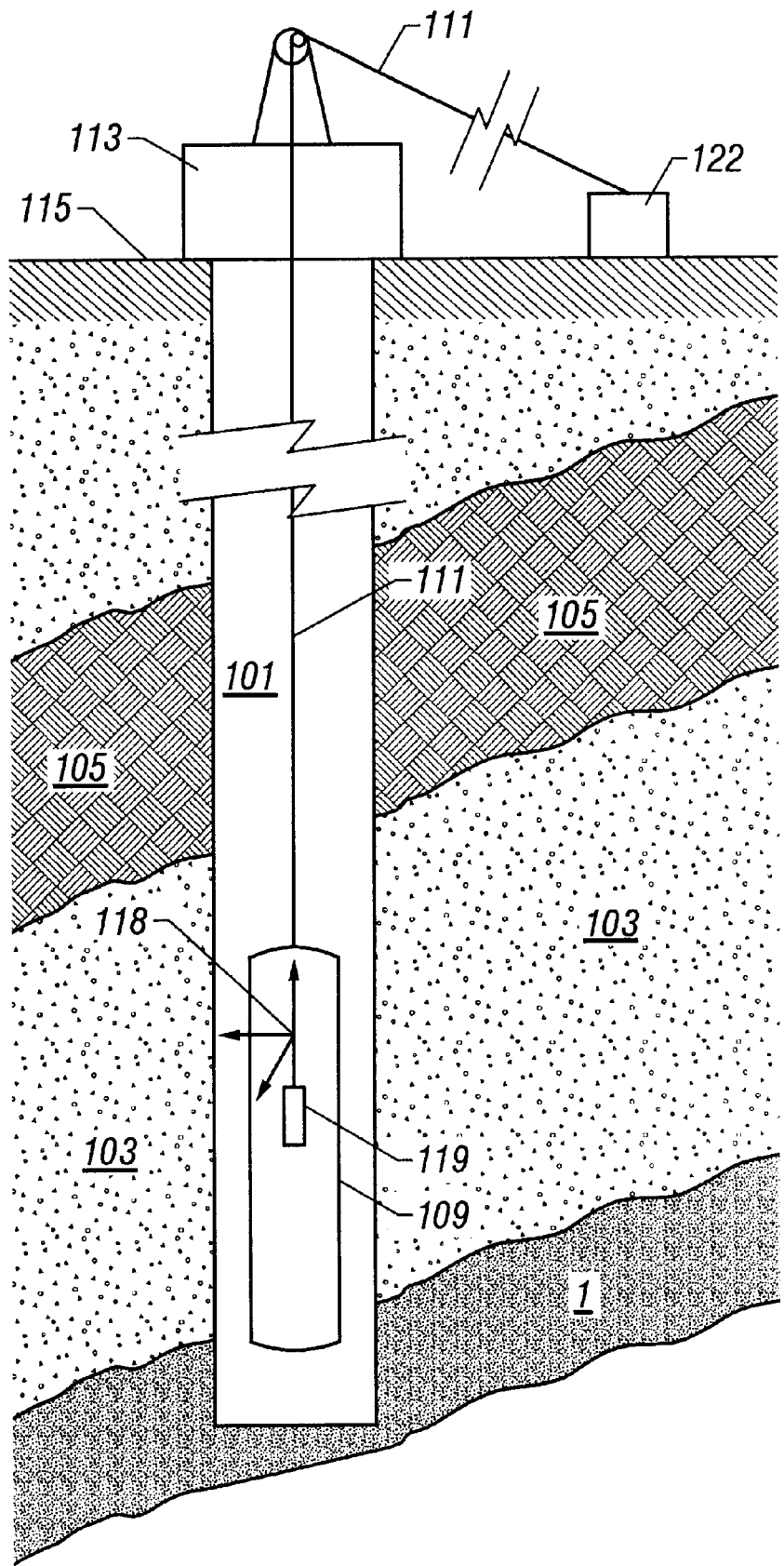
FIG. 4 is an illustration of a preferred embodiment of the present invention shown deployed in a wire line environment.

Turning now to FIG. 4 a wire line deployment of the present invention is depicted. FIG. 4 schematically shows a well bore 101 extending into a laminated earth formation, into which well bore a logging tool including sensors and electronics as used according to the present invention has been lowered. The well bore in FIG. 4 extends into an earth formation which includes a hydrocarbon-bearing sand layer 103 located between an upper shale layer 105 and a higher conductivity than the hydrocarbon bearing sand layer 103. An electronic logging tool 109 having sensors and electronics and a sorption cooling apparatus used in the practice of the invention has been lowered into the well bore 101 via a wire line 111 extending through a blowout preventor 113 (shown schematically) located at the earth surface 115. The surface equipment 122 includes an electric power supply to provide electric power to the set of coils 118 and a signal processor to receive and process electric signals from the sensors and electronics 119. Alternatively, a power supply and signal processor are located in the logging tool. In the case of the wire line deployment, the wire line may be utilized for provision of power and data transmission.

Figure 5:
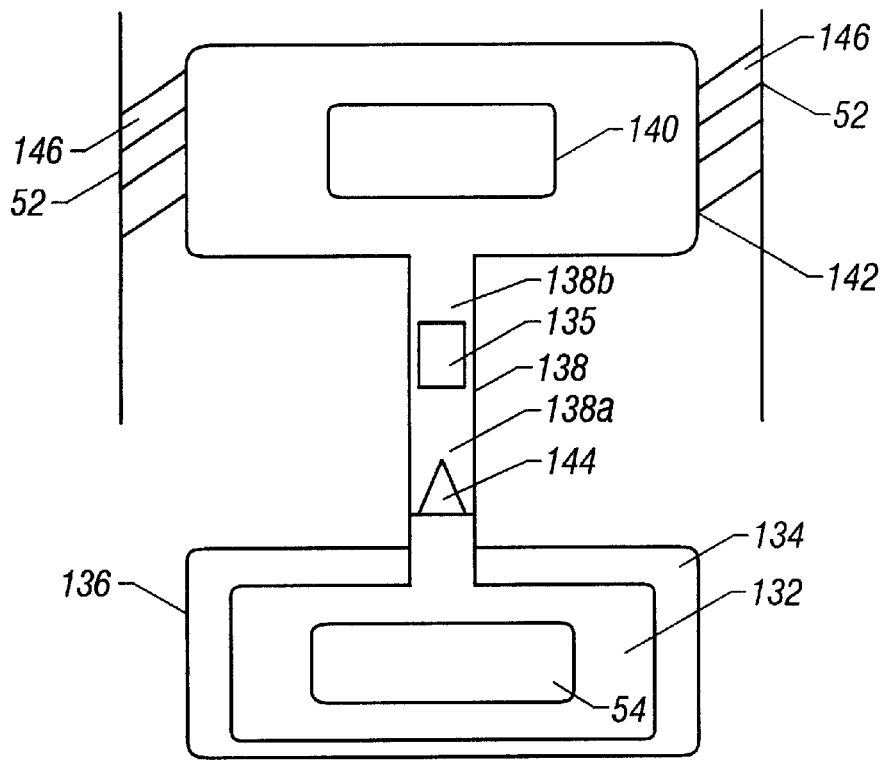
FIG. 5 is an illustration of a preferred embodiment of the present invention showing a detailed schematic of the cooling system components surrounding the electronics having a porous rock or water wet porous medium filter for controlling the vaporization rate.

Turning now to FIG. 5, a schematic representation of a preferred embodiment of the present invention is depicted. In a preferred embodiment, the electronics 54 or a sensor are surrounded by a container 132 of liquid, preferably water. The container 132 may also be positioned adjacent to electronics 54. The electronics 54 and liquid container 132 are encased and surrounded by a phase change material 134. The phase change material acts as a temporary heat sink which retards heat flow into the chamber formed by the interior of the phase change material. The electronics 54, liquid container 132, and phase change material 134 are encased and surrounded by, preferably a insulating Dewar flask 136. Insulating Dewar flask 136 and phase change material 134 serve as thermal insulator barriers to retard heat flow from surrounding areas into the electronics 54.

Vapor passage 138 runs through Dewar flask 136, phase change material 134 and liquid container 132, thereby providing a vapor escape route from liquid container 132 to desiccant 140. As the water evaporates, the water vapor escapes through the vapor passage and removes heat from the adjacent to electronics 54 or cools a similarly situated sensor. The vapor evaporates from the liquid container 132 and passes through vapor passage 138 to desiccant 140 where the vapor is adsorbed. The liquid, preferably water, cools at it evaporates, thereby cooling electronics 54 adjacent to liquid container 132. Desiccant 140 adsorbs water vapor thereby keeping the vapor pressure low inside of liquid container 132 and facilitating further evaporation and cooling.

Filter 135 comprises a porous rock which controls evaporation and thus controls the temperature of the liquid inside container 132 by controlling the evaporation rate of the liquid from liquid container 132. Filter 135 controls the vapor pressure inside liquid container 132, thereby controlling the evaporation rate from the liquid inside of liquid container 132 by controlling the flow rate of vapor escaping from liquid container 132. In a preferred embodiment filter 135 comprises a passive filter of porous rocks. Any suitable material which temporarily absorbs the water vapor or temporarily retards the flow of the vapor from lower passage 138a through vapor passage 138 and releases it again to the upper portion 138b of vapor passage 138 is a suitable filter. The filter 135 releases the vapor into the upper vapor passage 138b where it travels through the upper vapor passage 138b to desiccant 140. Thus, passive filter 135 limits the cooling rate of the electronics during a down hole run to avoid overcooling to an unnecessarily low temperature that would cause more rapid heat flow across Dewar walls and therefore waste water and desiccant.

Desiccant 140 is contained in desiccant chamber 142 which is in thermal contact with down tool housing 52. Down hole tool housing is in thermal contact with bore hole annulus containing bore hole mud 23, thereby enabling heat to flow out of desiccant chamber 142 into the bore hole. Thus, heat is removed from electronics 54, and transmitted to desiccant 140 via the liquid vapor and conducted out of the down hole tool housing 52 to the bore hole.

In an alternative embodiment, an active filter 150 is provided which controls the rate of vapor flow in relation to the temperature of the vapor, thereby controlling the ambient operating temperature of the electronics. The opening and closing of active filter 150 is controlled by a thermomechanical element or an electromechanical element to control the liquid evaporation rate. Thus, active filter 150 controls the temperature of the ambient operating temperature of the electronics during a down hole run. Active filter 150 can be controlled based on current temperature in the electronics area, vapor pressure or thermal conditions.

Figure 6:
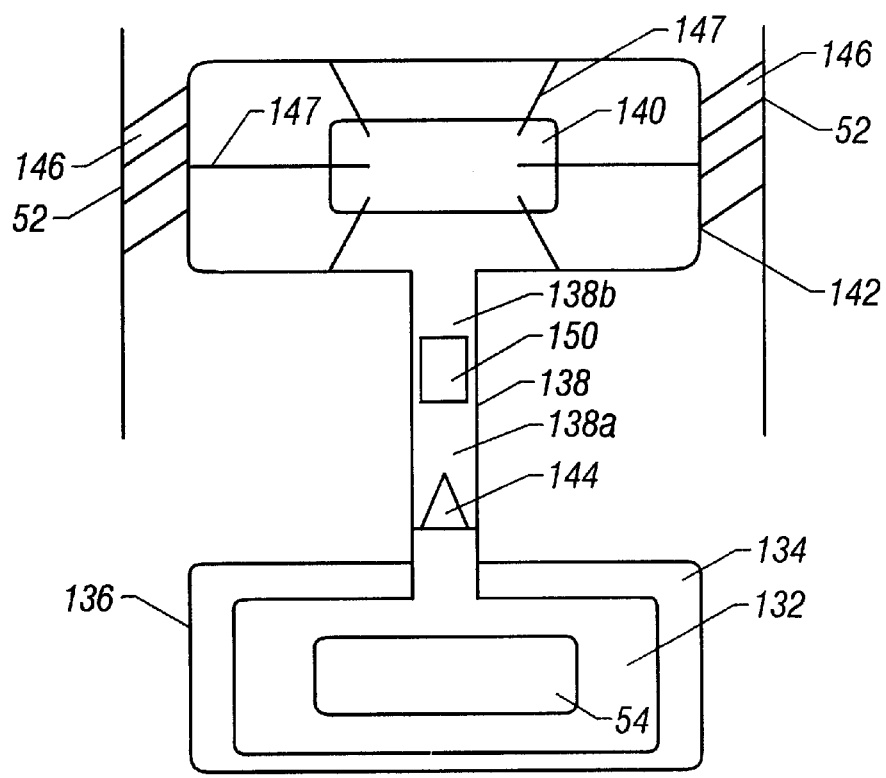
FIG. 6 is an illustration of a alternative embodiment of the present invention showing a detailed schematic of the cooling system components surrounding the electronics and an active filter.

In a preferred embodiment, as shown in FIGS. 5 and 6, the filter 135 or 150 is placed in the vapor passage 138, between the liquid supply 132 and the desiccant 140, to control the evaporation rate of the liquid. Preferably a porous rock is utilized as an evaporation filter to control the vapor pressure and retard vaporization. Any water-wet porous medium of low permeability is useful as a rate-limiting valve for the transfer of water vapor from the water reservoir to the sorbent. In an alternative embodiment, a thermally sensitive active filter is provided to thermally control vaporization rate based on the temperature inside of the electronics chamber or some other desired temperature measurement point associated with the down hole tool. In another embodiment, the active filter is controlled based on the vapor pressure or time expired for the run and the mud temperature or downhole temperature. In yet another embodiment the active filter is controlled based on a combination of one or more of the temperature history versus time, present temperature, vapor pressure, run duration or some other parameter such as the sorbent saturation level.

The typical metal Dewar flask filled with ethylene glycol placed in a 300° F. oven manifests a heat transfer rate range of 0.00824 W/(cm degree K) to 0.03670 W/(cm degree K) for an average of 0.01861 W/(cm degree K). Heat leaks into the flask at the rate of 1–2 Watts when we assume a 2–5° F./hour maximum rate of temperature increase for ethylene glycol, and we assume that the ethylene glycol's initial temperature is 75° F., its density is 1.11 grams/cc, and its specific heat is 0.548 cal/gram-° C. The flask by itself is not a super insulator as compared to the equivalent thermal conductivity of a container having the same wall thickness as the Dewar flask but which is made of other materials such as Aerogel (0.00016 W/(cm degree K)); Alumina Silica Paper (0.00062 W/(cm degree K)); Silica Blanket (0.00065 W/(cm degree K)); Alumina Mat LD (0.00070 W/(cm degree K)); Alumina ECO-1200 Board (0.00140 W/(cm degree K)); and Fiber Refractory Composite Insulation (FRCI) (0.00236 W/(cm degree K)). These other insulator materials thus are to be used as insulators surrounding the electronics, liquid chill supply and Dewar flask. The insulator material may also be used inside of the flask or in lieu of the Dewar flask as an insulator. Aerogel (available from Jet Propulsion Lab, Pasadena, Calif.) is the lightest weight insulator with the lowest heat leakage rate, which could be utilized inside the Dewar flask in the present invention.

However, Aerogel is very fragile and expensive. Microtherm A (0.00020 W/(cm degree K @ 298° K) is a powdery material, which is 1.25 times less insulating than Aerogel, yet still has less thermal conductivity than still air (0.00236 W/(cm degree K)). Fiber Refractory Ceramic Insulator (FRCI) (0.000236 W/(cm degree K)) is available in a light weight brick (Forest Machining of Valencia, Calif.), that 15 times less insulating that Aerogel, but 8 times more insulating (for the same wall thickness) as a typical metal Dewar flask. FRCI has the desirable characteristic that is not excessively fragile or powdery and that it can be machined to any desired shape.

Molecular sieves are synthetic zeolites that are often described by their approximate pores sizes. For example, molecular sieve 3A (potassium aluminosilicate) has 3-Angstrom pores while molecular sieve 4A (sodium aluminosilicate) has 4-Angstrom pores. Molecular sieve 3A (available from EM Science, Gibbstown, N.J. or Zeochem, Louisville, Ky.) can be used as the sorbent. The name molecular sieve comes from the fact that the pore sizes of these sorbents are so small that they are actually able to screen molecules by size. Molecular sieve 3A is often used to remove trace amounts of water from hydrocarbon solvents because water molecules are small enough to enter its 3-Angstrom pores and be sorbed whereas the hydrocarbon molecules are too big to enter its pores.

Molecular Sieve 3A regenerates (releases its adsorbed water) when kept for about an hour at temperatures of 175–260° C. Molecular sieve 4A (available from Zeochem, Louisville, Ky.) regenerates at temperatures of 200–315° C. The higher the regeneration temperature of molecular sieve, the less likely that elevated well-bore temperature will slow or stop molecular sieve's adsorption of water.

Several sorbents have been considered which may also be acceptable for use in the present invention, depending on the operating conditions and design implementation of the invention. Alternative and suitable replacement sorbents are commercially available. Some common sorbents and their typical properties are activated carbon (60–80% porosity, 20–40 Angstrom pores, 100–150° C. to regenerate), silica gel (40–50% porosity, 20–50 Angstrom pores, 120–250° C. to regenerate), activated aluminas (35–40% porosity, 30–50 Angstrom pores, 150–320° C. to regenerate), molecular sieves (30–40% porosity, 3–10 Angstrom pores, 200–300 to regenerate), and polymer resins (40–50% porosity, 90–100 Angstrom pores, 80–140° C. to regenerate).

Several phase change materials have been considered: Cerrolow-117; Cerrobase; Cerrolow-136; Cerrobend; Cerrotru; Gallium; Thermasorb 122; Thermasorb 43; Thermasorb 65; Thermasorb 95; Thermasorb 83; Thermasorb 143; Thermasorb 215; and Thermasorb 175. Cerro phase change materials (Cerro Metal Products, Bellefonte, Pa.) are eutectic mixtures of Bismuth, Lead, Tin, Cadmium, Indium, and Antimony with latent heats of fusion from 3.3–11.1 cal/g and melting points of 47–138° C. Thermasorb phase change materials (Thermasorb Frisby Technologies, Winston-Salem, N.C.) are micro-encapsulated long straight-chain paraffinic hydrocarbons (such as $C_nH_{2n+2}$, where n ranges from 10 to 30) having latent heats of fusion from 38–47 cal/g and melting points of 6–101° C.

Several efficient heat conductors have been considered as follows: Diamond (9.90 W/cm-° K), Silver (4.28 W/cm-° K), Copper (4.01 W/cm-° K), Pyrolitic (Single-Crystal) Graphite (4.00 W/cm-° K), Gold (3.18 W/cm-° K), Boron Nitride (2.71 W/cm-° K), and Aluminum (2.36 W/cm-° K) as shown in FIG. 5. These efficient heat conductors 146 are utilized for coupling the desiccant chamber 140 to the tool pressure housing 52 to enable efficient thermal coupling and heat flow from desiccant chamber to the pressure housing and well bore. In a preferred embodiment, these materials improve thermal coupling by surrounding the desiccant, or in an alternative embodiment, as shown in FIG. 6, are provided with fins 147 or rods which extend into the body of the desiccant granules, whose thermal conductivity is only about 0.00042 W/cm-° K in air at one atmosphere.

Figure 7:
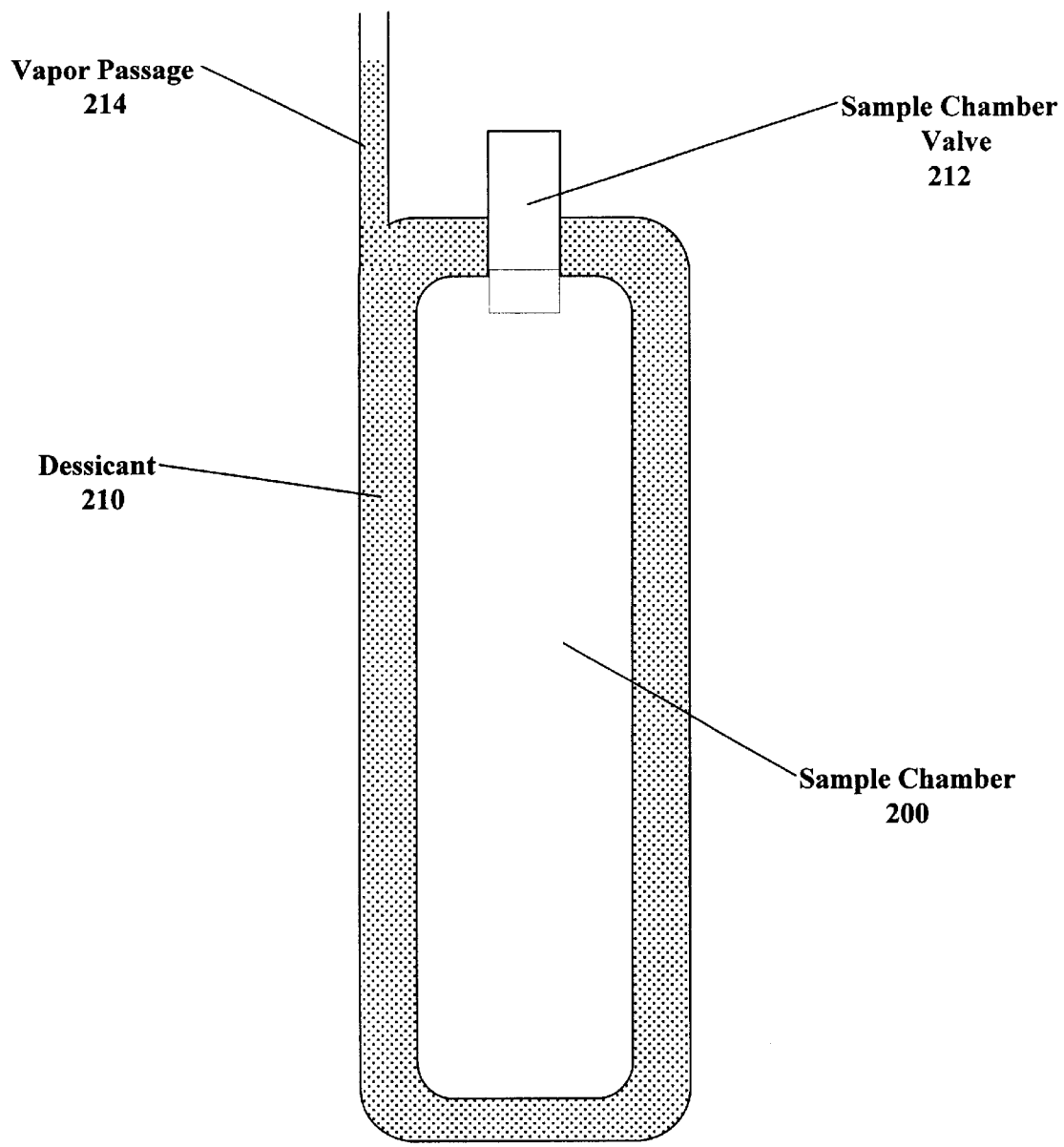
FIG. 7 is an illustration of a alternative embodiment of the present invention showing a detailed schematic a sorption heating apparatus surrounding a hydrocarbon sample chamber.

Turning now to FIG. 7, FIG. 7 is an illustration of another alternative embodiment of the present invention showing a detailed schematic of a sorption heating apparatus surrounding a hydrocarbon or other formation fluid sample chamber. By pumping the heat toward the sample chamber, the sorption process heats the sample chamber to keep the chamber from cooling down as it is removed from a down hole sampling tool. This reduces cooling and associated depressurization of the sample as the sample is brought to the surface. In this way, the sample can be maintained in a single phase the same as it was downhole. Maintaining the sample in a single phase is important because, if the sample separates into two phases, it can be difficult and time consuming to recombine it into a single phase at the surface. A single phase sample is required to perform many of laboratory thermodynamic measurements. As shown in FIG. 7, a sample tank 200 is surrounded by dessicant 210. The sample chamber is sealed by valve 212. Vapor passage 214 enables water vapor carrying heat removed from another section of the tool to enter the dessicant adjacent sample chamber 200 and thereby heating sample chamber 200 and its contents.

Also, this sorption heating can be used to heat an element such as a quartz clock crystal. Quartz crystals are often maintained at the crystal's "turnover" temperature at which its frequency is the most stable. If the crystals turnover temperature is less than the downhole temperature, heating to that temperature is beneficial.

For separating liquid water from vapor, the present invention uses a thick chemical-affinity or microporous membrane. For throttling the water vapor, the present invention preferably uses a butterfly valve. Nafion, is a commercially available filter. Nafion is trademark of DuPont for its perfluorosulfonate ionomer membrane, a chemical-affinity membrane for use in filtering based on chemical affinity. For additional information Nafion and for a description of the effects of temperature on Nafion dryers see, http://www.permapure.com/newweb/Temperature%20Effects.htm. See, http://www.permapure.com/newweb/HUM/PH-DIMENSIONS.htm for a description regarding dimensions of a humidifier based on 0.060"-diameter Nafion tubes. See, http://www.permapure.com/newweb/HUM/Hum-SETUP.htm for a description of water Supplied by Circulation Feed, that is, water flows inside Nafion tubing and water vapor exits Nafion. Microporous membranes, which are selected for filtering based on membrane pore size versus molecule Size. See, http://www.devicelink.com/mpb/archive/97/03/002.html for a description of microporous hydrophobic membranes including Teflon (PTFE) ones. See, http://nalgenelab.nalgenunc.com/resource/application/matprop.html#ptfe for a description of Micoporous Filter Membrane Guide Material Properties.

While a preferred embodiment of the present invention has been described herein, it is for illustration purposes and not intended to limit the scope of the invention as defined by the following claims.

What is claimed is:

1. A sorption heating apparatus for use a down hole tool housing deployed on a wire line tool or a drill stem comprising:
   a container of liquid forming a first region within a down hole tool;
   a desiccant located in a second region of the tool;
   a vapor passage between first region containing the liquid and the second region containing the desiccant, thereby enabling vapor generated during evaporation of the liquid to pass from the first region through the vapor passage to the desiccant in the second region.

2. The apparatus of claim 1 further comprising:
   a filter located between the first region containing the liquid and the second region containing the desiccant for controlling the evaporation rate of the liquid.

3. The apparatus of claim 2 wherein the filter comprises a water wet porous medium for retarding the rate of evaporation from the liquid.

4. The apparatus of claim 2 wherein the desiccant comprises a thermal-sensitive device which enables evaporation when a selected temperature is exceeded.

5. The apparatus of claim 2 wherein an electronics or sensor and adjacent to liquid supply are surrounded by a phase change material.

6. The apparatus of claim 2 wherein the filter comprises a device which enables evaporation based on the temperature history of the first region.

7. The apparatus of claim 2 wherein an electronics or sensor and adjacent to liquid supply are contained in a Dewar flask.

8. The apparatus of claim 2 wherein the desiccant further comprises fins of thermally conductive material extending from the desiccant to the tool housing to transfer heat from the desiccant to the tool housing.

9. The apparatus of claim 2 wherein the desiccant comprises a molecular sieve.

10. The apparatus of claim 1, further comprising:
    a sample chamber in thermal communication with the second region of the tool.

11. The apparatus of claim 1, further comprising:
    a clock crystal in thermal communication with the second region of the tool.

12. A method for heating a region in a down hole tool deployed on a wire line tool or a drill stem comprising the steps for:
    evaporating liquid from a container of positioned in a first region within a down hole tool;
    providing a desiccant located in a second region of the tool;
    providing a check valve to prevent spillage of the liquid; and
    providing a vapor passage between first region containing the liquid and the second region containing the desiccant, thereby enabling vapor generated during evaporation of the liquid to pass from the first region through the vapor passage to the desiccant in the second region, thereby transferring heat from the first region to the second region.

13. The method of claim 12 further comprising the step for:
    providing a filter located between the first region containing the liquid and the second region containing the desiccant for controlling the evaporation rate of the liquid.

14. The method of claim 13 wherein the filter comprises water wet porous medium for retarding the rate of evaporation from the liquid.

15. The method of claim 13 wherein the desiccant comprises a thermal-sensitive device which enables evaporation when a selected temperature is exceeded.

16. The method of claim 13 wherein an electronics or sensor and adjacent to liquid supply are surrounded by a phase change material.

17. The method of claim 13 wherein an electronics or sensor and adjacent to liquid supply are contained in a Dewar flask.

18. The method of claim of claim 13 wherein the filter comprises a device which enables evaporation based on the temperature history of the first region.

19. The method of claim 13 wherein the desiccant comprises a molecular sieve.

20. The method of claim 13 further comprising the step for:
    providing fins of thermally conductive material extending from the desiccant to the tool housing to transfer heat from the desiccant to the tool housing.

21. The method of claim 12 wherein a sample chamber is located adjacent the dessicant for heating the sample chamber.

22. The method of claim 12 wherein a clock crystal is located adjacent the dessicant for heating the clock crystal.

* * * * *